Nov. 28, 1950 — J. SCHLAEPFER — 2,531,992
SPEED CHANGE POWER-TRANSMISSION
Filed July 3, 1947
Fig.1
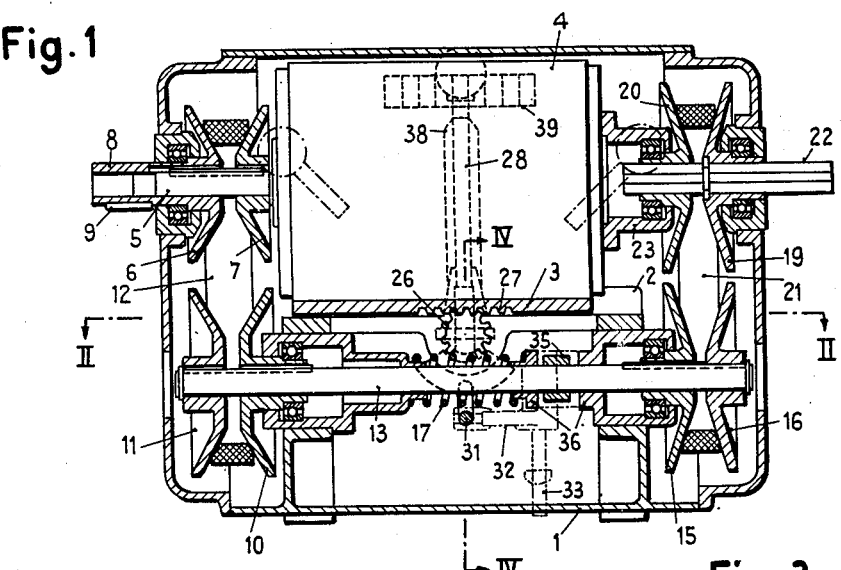
Fig.4
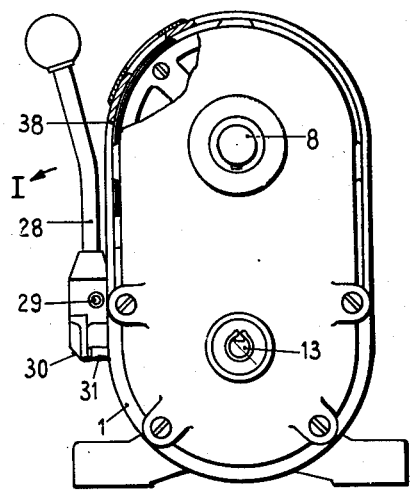
Fig.3
Fig.2
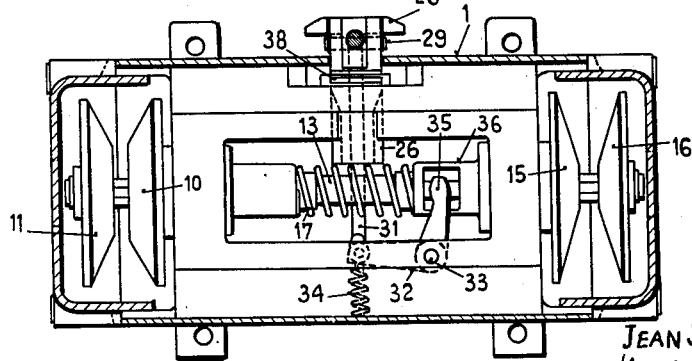
Inventor:
JEAN SCHLAEPFER
by Walter S. Bleston
ATTORNEY Patented Nov. 28, 1950

2,531,992

UNITED STATES PATENT OFFICE 2,531,992

SPEED CHANGE POWER TRANSMISSION

Jean Schlaepfer, Zurich, Switzerland

Application July 3, 1947, Serial No. 758,762
In Switzerland October 30, 1946

6 Claims. (Cl. 74—230.17)

1

This invention relates to a speed-change transmission unit and particularly to a unit of this kind employing a novel type of belt pulleys, each comprising a pair of conically shaped disk-wheels engaging between them a belt for power transmission.

According to this invention, I provide for a speed-change power-transmission unit comprising at least two pairs of conically shaped disk-wheels, a power driven motor, at least one take-off shaft enclosed together in a housing adapted to be operated by a lever, the motor movably disposed so as to be bodily spaced for various positions within the housing whereby each movement to another position causes a change in the speed of the take-off shaft.

Other and more detailed objects of my invention will be apparent from the following disclosure of an embodiment thereof illustrated in the attached drawings.

In the accompanying drawings—

Figure 1 is a longitudinal section,

Figure 2 a section along the line II—II of Figure 1,

Figure 3 a front view,

Figure 4 a section along the line IV—IV of Figure 1.

As illustrated in the drawing, the housing 1 is provided with a cover-plate and contains a carriage 3 supported on a structure 2. A motor 4 is by means of screw-bolts (not shown) securely fastened to the carriage whereof it is carried to various positions in the housing. On an extension of the shaft 5 a pair of conically shaped disk-wheels 6, 7 are mounted. The disk-wheel 7 is mounted in such manner on the shaft 5 as to be axially movable and the disk-wheel 6 is securely fastened on the same shaft and provided with a sleeve type extension 8 having a key 9 seated on it providing thereby for a power drive of any suitably coupled machine. Over the disk-wheels 6, 7 and a second pair of disk-wheels 10, 11, the latter mounted on a counter-shaft 13, a belt of conic section is provided. The disk-wheels 10, 11 are movably mounted for spacing in axial direction at one end of the counter-shaft 13, at the other end another pair of conically shaped disk-wheels 15 and 16 are mounted in the same manner. A spring 17 is suitably located to resiliently urge the disk-wheels 10, 15 against their associated wheels 11, 16. Over the pair of disk-wheels 15, 16 and a fourth pair of conically shaped disk-wheels 19, 20, a belt 21 of conic cross-section is placed. The disk-wheel 19 is firmly secured on the take-off shaft 22 and the disk-wheel 20 is

2 movably mounted for spacing in the direction of this shaft 22 which is to be employed as a power-drive for any thereto suitably coupled machine and is able to change its speed in a manner to be disclosed hereafter. The disk-wheel 20 is by means of a support 23 connected to the housing of the motor 4.

Of the four pairs of conically shaped disk-wheels at least two pairs may be provided with different outside diameters in relation to each other. Furthermore at least two pairs of the disk-wheels may be provided with conic surfaces of different inclinations in relation to the other two pairs. The take-off shaft may be located co-axially in relation to the positions of the motor.

A mechanism in the housing 1 comprises an axle 25 supported in the housing, see Figure 4, and contains a pinion 26 engaging a toothed portion of the carriage 3. By a pivot-pin 29 a lever 28 is mounted on the axle 25 in such manner as to firmly engage said axle when rotated, but when pulled in the direction of said axle pivotally movable on said pin. An arm 30 on the lever 28, extending in downward direction, is contacting a movably supported push-rod 31. The other end of the rod 31 is hingedly connected with a lever-arm 32 which engages rotatively an axle 33. A fork 35 fastened on the axle 33 is thereby connected to the arm 32 which urges by a spring 34 the rod 31 against the extension 30. The fork 35 operatively engages a sleeve 36 which is connected to the conical disk-wheel 15. An indicator 38 is fastened to the lever 28 and indicates its positions on a dial 39, the readings permitting an accurate setting of the transmission unit.

The change speed power-transmission unit described functions as follows:

From Figure 1 it is apparent that when the motor 4 is running it drives the shaft 5 and the disk-wheels 6, 7 including the shell 8—securely or integrally attached to 6. Transmission of the speed of the motor to another machine may be effected over the so driven sleeve 8. By means of the belt-drive 12, the shaft 13 is driven by the disk-wheels 10, 11. The conically shaped disk-wheels 15, 16 and the take-off shaft 22 are driven by the belt-drive 21 acting on the disk-wheels 19, 20. The speed of the take-off shaft is changed in accordance with the spacing of the conically shaped disk-wheels. In order to increase the speed of the take-off shaft 22, the spacing between the individual disk-wheels, for this purpose, is effected by rotation of the lever 28 to the left, see Figure 1, whereby the motor is moved by mechanism represented by the axle 25, and the pinion 26 engaging the toothed portion of the carriage 3 carrying the motor, thereby moving the disk-wheel 7 towards the disk-wheel 6, hence the disk-wheel 11 is forced away from the disk-wheel 10 by means of the belt-drive 12 —because tensioning of the belt-drive 12 cannot take place—whereby the speed of the shaft 13 is increased; when the disk-wheel 16 is at the same time moved towards the disk-wheel 15, and because their spacing is also changed by means of the carrier 23 the position of the disk-wheel 20, the belt-drive 21—engaging the conically shaped pairs of disk-wheels—changes its position accordingly, thus increasing the speed of the take-off shaft 22. On the other hand, the speed of the shaft 22 is decreased when the lever 28 is rotated towards the right-hand side, see Figure 1. The speed of the take-off shaft 22 may be continuously changed by spacing of the motor 4 in axial direction.

Pivoting of the lever 28 in the direction indicated by the arrow I, see Figure 3, urges the arm 30 to move the rod 31 inwardly, thus rotating the lever 32 and also the fork 35 on the axle 33, thereby forcibly moving the sleeve 36 including the conically shaped disk-wheel 15 against the pressure of the spring 17, this causes slackening of the belt-drive 21 preventing it thereby to rotate the take-off shaft 22 while the motor is still running—effecting uncoupling of the shaft 22 with the motor 4. In the referred to pivoted position of the lever 28, the lever may also be rotated to the left or right hand side, see Figure 1. The conical wheels are then thereby spaced so as to translate to the take-off shaft 22 the desired speed immediately after the lever 28 is pivotally moved in the other direction to assume its position indicated in Figure 3.

The speed of the take-off shaft may be widely varied, i. e., from 280 to 3400 R. P. M., by different inclinations of the oblique surfaces of the disk-wheels in combination with proper selection of their diameters. Thus the speed limits of the take-off shaft 22 may be changed over a wide range.

Obviously the motor may be arranged in the bottom-portion of the housing 1 and the take-off shaft 22 may be placed beyond the top of the motor. However by choosing an arrangement of the motor between the driven shafts 8 and 22, a more compact design of the unit is attained.

What I wish to secure by U. S. Letters Patent is:

1. A variable speed power transmission unit comprising a stationary structure, a motor including a motor shaft and being mounted to said structure so as to be movable in the direction of said motor shaft axis, a countershaft journaled in said structure so as to be axially shiftable in relation thereto, an output shaft, said three shafts being parallel to each other, split V-pulleys of which one being mounted on each of said motor and output shafts and two on said countershaft in registry with said other pulleys respectively, belts connecting the pairs of registering pulleys respectively, each pulley including two conical discs between which the associated belt engages, one disc of each of said motor shaft and output shaft pulleys being axially movable with said motor, one of the discs of each of said countershaft pulleys being fixed to the latter, all other pulley discs being connected to their associated shafts for common rotation, means to hold said other discs stationary in axial direction relatively to said structure, and manually controllable means to shift said motor in relation to said structure in the direction of the motor shaft axis.

2. A transmission unit as claimed in claim 1, said stationary structure including a main housing portion and two end portions releasably attached to said main portion, one disc of at least one pulley of each pair being journaled in its adjacent end portion of said housing and removable together with it and including means adapted to engage the associated shaft for common rotation.

3. A power transmission unit as claimed in claim 1, comprising a carriage to which said motor is secured, means included in said structure to guide said carriage in the direction of the motor shaft axis, and said manually controllable means being operatively connected to said carriage.

4. A power transmission unit as claimed in claim 1, comprising a carriage to which said motor is secured, and which includes a rack, means included in said structure to guide said carriage in the direction of the motor shaft axis, said manually controllable means being journaled in said structure and including a pinion in engagement with said rack.

5. A power transmission unit including a motor shaft, an output shaft, a countershaft, split pulleys on said shafts and belt connections between said pulleys on said countershaft and said other shafts, respectively, wherein one rotatable element of each of said pulleys is axially shiftable in relation to the second rotatable element in order to attain changeability of the output speed, the second elements of three of said pulleys being stationary as to their location, the second element of said fourth pulley having an operative position for co-operation with the first element in engaging the co-ordinate belt and an inoperative position axially spaced from its operative position, first manually controllable means to shift the first elements of two of said pulleys in relation to their second elements, and second manually controllable means to shift the second element of said fourth pulley from one of its positions into the other one.

6. A mechanism as claimed in claim 5, wherein said first controllable means includes a rotatable drive shaft, and said second controllable means includes a first lever, further comprising a second lever pivoted on said drive shaft about an axis transverse with respect to the drive shaft axis and having an arm engaging said first lever, whereby the first controllable means can be operated by a turn of said second lever about the drive shaft axis, and the second controllable means can be operated by a turn of said lever about said pivot axis.

JEAN SCHLAEPFER.

REFERENCES CITED

The following references are of record in the file of this patent:

UNITED STATES PATENTS

| Number | Name | Date |
|---|---|---|
| 2,251,488 | Hucke | Aug. 5, 1941 |
| 2,486,095 | Armstrong | Oct. 25, 1949 |

FOREIGN PATENTS

| Number | Country | Date |
|---|---|---|
| 551,872 | France | Jan. 15, 1923 |